US008430378B2

(12) United States Patent
Hutchings et al.

(10) Patent No.: US 8,430,378 B2
(45) Date of Patent: Apr. 30, 2013

(54) HIGH FLOW PROPORTIONAL VALVE

(75) Inventors: Peter G. Hutchings, Granger, IN (US); Mark A. Beasley, South Bend, IN (US); Deron Kaczorowski, South Bend, IN (US); Donald Sack, Granger, IN (US)

(73) Assignee: South Bend Controls Holdings LLC, South Bend, IN (US)

( * ) Notice: Subject to any disclaimer, the term of this patent is extended or adjusted under 35 U.S.C. 154(b) by 1043 days.

(21) Appl. No.: 12/206,158

(22) Filed: Sep. 8, 2008

(65) Prior Publication Data

US 2009/0294712 A1  Dec. 3, 2009

Related U.S. Application Data

(60) Provisional application No. 61/130,393, filed on May 30, 2008.

(51) Int. Cl.
*F16K 31/02* (2006.01)
(52) U.S. Cl.
USPC ............... 251/129.17; 251/129.18; 251/157; 251/331; 137/859
(58) Field of Classification Search ............ 251/129.17, 251/129.18, 157, 331; 137/859
See application file for complete search history.

(56) References Cited

U.S. PATENT DOCUMENTS

| | | | |
|---|---|---|---|
| 3,134,932 A * | 5/1964 | Ray | 335/257 |
| 3,174,717 A | 3/1965 | Bray | |
| 3,423,062 A | 1/1969 | Grayson | |
| 3,554,487 A | 1/1971 | Vesco | |
| 3,796,229 A | 3/1974 | Wright | |
| 3,960,361 A | 6/1976 | York | |
| 4,349,045 A | 9/1982 | Kah, Jr. | |
| 4,463,332 A | 7/1984 | Everett | |
| 4,527,590 A | 7/1985 | Kolze | |
| 4,647,011 A | 3/1987 | Contzen et al. | |
| 4,767,097 A | 8/1988 | Everett et al. | |
| 4,834,337 A | 5/1989 | Chorkey et al. | |
| 4,954,799 A | 9/1990 | Kumar | |
| 4,986,308 A | 1/1991 | Champseaux | |
| 5,027,857 A | 7/1991 | Champseix | |
| 5,046,701 A * | 9/1991 | Barber | 251/129.02 |
| 5,199,462 A | 4/1993 | Baker | |
| RE34,261 E | 5/1993 | Sule | |

(Continued)

FOREIGN PATENT DOCUMENTS

| | | |
|---|---|---|
| CH | 381 489 | 8/1964 |
| EP | 1 666 780 A1 | 6/2006 |

(Continued)

*Primary Examiner* — John K Fristoe, Jr.
*Assistant Examiner* — Jessica Cahill
(74) *Attorney, Agent, or Firm* — Faegre Baker Daniels, LLP

(57) ABSTRACT

In one embodiment of the invention, a valve apparatus is provided to proportionally control fluid flow. The valve apparatus includes a housing having a valve body with an inlet port having a valve seat and an outlet port; a valve assembly including an armature, a movable fluid control member, and at least one spring biasing the valve assembly into a closed position, a diaphragm in contact with the valve seat of the inlet port when the valve is in the closed position, and a poppet plate backing the diaphragm, in contact with the fluid control member and extending beyond the valve seat on the inlet port. The valve apparatus also has a solenoid assembly including an electromagnetic coil and a pole piece, the solenoid moves the armature when energized to allow fluid to flow through the valve apparatus.

8 Claims, 14 Drawing Sheets

U.S. PATENT DOCUMENTS

| | | | |
|---|---|---|---|
| 5,232,196 A | 8/1993 | Hutchings et al. | |
| 5,386,849 A * | 2/1995 | Gilchrist et al. | 137/605 |
| 5,470,045 A | 11/1995 | Kazama et al. | |
| 5,546,987 A | 8/1996 | Sule | |
| 5,653,422 A | 8/1997 | Pieloth et al. | |
| 5,676,345 A | 10/1997 | Zurke et al. | |
| 5,738,333 A | 4/1998 | Cognevich et al. | |
| 5,762,097 A | 6/1998 | Hettinger et al. | |
| 5,785,297 A | 7/1998 | Ha | |
| 5,797,586 A * | 8/1998 | Schulte | 251/129.02 |
| 5,799,696 A | 9/1998 | Weiss | |
| 5,845,675 A | 12/1998 | Ligh | |
| 5,983,941 A | 11/1999 | Fritz et al. | |
| 6,047,947 A | 4/2000 | Kumar | |
| 6,173,736 B1 | 1/2001 | Ligh | |
| 6,224,033 B1 | 5/2001 | Kumar | |
| 6,325,354 B1 | 12/2001 | Hoen et al. | |
| 6,354,562 B1 * | 3/2002 | Fukano et al. | 251/30.03 |
| 6,394,136 B1 | 5/2002 | Rohrbeck | |
| 6,460,558 B2 | 10/2002 | Anderson | |
| 6,484,754 B1 | 11/2002 | Muth et al. | |
| 6,604,726 B2 | 8/2003 | Kumar | |
| 6,685,165 B1 | 2/2004 | Kloehn et al. | |
| 6,715,732 B2 | 4/2004 | Kumar | |
| 6,722,629 B1 * | 4/2004 | Nakazawa | 251/129.17 |
| 6,752,371 B2 * | 6/2004 | Herbert et al. | 251/54 |
| 6,974,117 B2 | 12/2005 | Dzialakiewicz et al. | |
| 7,686,280 B2 * | 3/2010 | Lowery | 251/362 |
| 2005/0145812 A1 | 7/2005 | Kumar | |

FOREIGN PATENT DOCUMENTS

| | | |
|---|---|---|
| FR | 2 671 597 A1 | 7/1992 |
| GB | 2 003 586 | 3/1976 |
| JP | 05 172268 | 7/1993 |
| JP | 7063273 A2 | 3/1995 |
| WO | WO 00/03166 A1 | 1/2000 |
| WO | WO 2005/022017 A1 | 3/2005 |

* cited by examiner

HIGH FLOW PROPORTIONAL VALVE

This application claims the benefit of U.S. Provisional Patent Application Ser. No. 61/130,393 filed May 30, 2008, the complete disclosure of which is hereby expressly incorporated by reference.

BACKGROUND OF THE INVENTION

This invention relates to a valve apparatus for controlling fluid flow, and in particular, to a valve apparatus for providing proportional control of the fluid flow from an inlet port to an outlet port in a valve body of the apparatus.

In one type of a known solenoid operated valve, a plunger of magnetic material is slidable within the solenoid. A spring or other biasing means urges the plunger into contact with a valve seat. When no current is applied to the solenoid, the valve is maintained closed by the spring. When current flows and the solenoid is energized, a magnetic force acts against the spring to move the plunger away from the valve seat. When the magnetic force exceeds the force of the spring, the plunger moves out of contact with the valve seat into a remote position in which the valve is fully open. A valve of this type has two basic positions, open and closed.

A proportional valve is one in which the flow of fluid varies in proportion to the current supplied to a coil in the solenoid. Such a valve may be desirable for applications in which a gradual variation in flow is preferable to an abrupt change between on and off conditions.

Many designs have been proposed for proportional valves. An example of a known proportional valve is shown in U.S. Pat. No. 4,463,332 (the '332 patent) to W. Everett. The proportional valve in the '332 patent includes a solenoid having an electromagnetic coil and a pole piece. The pole piece is located within the electromagnetic coil, and an armature is located near the pole piece and separated therefrom by a core gap. The pole piece is mounted in the solenoid with a threaded engagement which can be adjusted to adjust the core gap. The armature is held in place by an armature retainer, and a pair of flat springs are held between the armature retainer and the armature. The solenoid in the '332 patent also includes an annular permanent magnet surrounding the coil to create a field of predetermined flux density in the pole piece. The solenoid assembly in the '332 patent is shown coupled to a valve assembly which utilizes a ball valve.

U.S. Pat. No. 4,767,097 to Everett et al discloses a proportional valve somewhat similar to that of the '332 patent, but which utilizes a different ball valve assembly and housing.

Another proportional valve is disclosed in U.S. Pat. No. 6,974,117 to Dzialakiewicz et al., which is hereby incorporated in its entirety herein by reference. This patent discloses a valve apparatus that includes a housing having a valve body with an inlet port and an outlet port. In one embodiment, the valve apparatus includes a valve assembly with an armature, a movable fluid control member, and at least one spring biasing the armature into contact with the fluid control member. The valve apparatus further includes a solenoid assembly having an electromagnetic coil and a pole piece. The pole piece and the armature define a gap that changes proportionally with the amount of current flowing through the electromagnetic coil. Fluid flow from the inlet port to the outlet port proportionally increases or decreases as the gap increases or decreases. The valve apparatus also has a valve seat, and the fluid control member contacts the valve seat to inhibit fluid flow through the apparatus when the electromagnetic coil is not energized.

SUMMARY OF THE INVENTION

In one embodiment of the invention, a valve apparatus is provided to control fluid flow. The valve apparatus includes a housing having a valve body with an inlet port having a valve seat and an outlet port; and a valve assembly including an armature, a movable fluid control member, and at least one spring biasing the valve assembly into a closed position, a sealing member or diaphragm in contact with the valve seat of the inlet port when the valve assembly is in the closed position, and a poppet plate attached to the diaphragm responding to movement of the fluid control member and extending over the valve seat on the inlet port. The valve apparatus also has a solenoid assembly including an electromagnetic coil and a pole piece, the solenoid moves the armature when energized to allow fluid to flow through the valve apparatus.

The diaphragm may extend over both the inlet port and the outlet port, and the diaphragm may include an annular channel extending around the valve seat. The valve apparatus may further include a retaining ring mounting the diaphragm to the housing, and the diaphragm may extend generally transverse to a longitudinal axis of the valve apparatus.

In one embodiment, the fluid control member includes a curved surface in contact with the poppet plate, and the curved surface is on a ball mounted in a recess in the armature.

In another embodiment, the fluid control member includes a stem connected to the armature, and the curved surface is on the end of the stem opposite from the end connected to the armature. The valve apparatus further includes a poppet body extending from the poppet plate, and the curved surface of the stem is received in a counter bore of the poppet body. The valve apparatus further includes a spring connected in the counter bore of the poppet body biasing the curved surface into a seat at the bottom of the counter bore. The valve apparatus also includes a cap having an opening through which the stem extends. The cap retains the curved surface of the fluid control member and the spring in the counter bore of the poppet body.

In a different embodiment, the fluid control member includes a hemispherical member connected to the armature. A magnet can be connected to the armature to magnetically retain the hemispherical member to the armature.

The valve apparatus may also include dual adjustments for control of the fluid flow. One adjustment adjusts the sealing force on the sealing member, and the other adjustment varies a gap between the armature and the pole piece.

In another embodiment of the invention, a valve apparatus is provided to control fluid flow, wherein the apparatus includes a housing having a valve body with an inlet port having a valve seat and an outlet port; a valve assembly including an armature, a movable fluid control member, at least one spring biasing the valve assembly to a closed position, a diaphragm in contact with the valve seat when the valve assembly is in the closed position, and a poppet plate backing the diaphragm and that can pivot to maintain alignment with the diaphragm; and a solenoid assembly including an electromagnetic coil and a pole piece, the solenoid moving the armature when energized to allow fluid to flow through the valve apparatus.

The poppet plate may extend beyond edges of the valve seat. The valve apparatus may also include a retaining ring mounting the diaphragm to the housing. The diaphragm may extend generally transverse to a longitudinal axis of the valve apparatus. The diaphragm can include an annular channel extending around the valve seat of the inlet port.

In one embodiment, the fluid control member can include a ball mounted in a recess in the armature.

In another embodiment, the fluid control member includes a stem with one end of the stem mounted to the armature, and a curved surface is on the opposite end of the stem. A poppet body extends from the poppet plate, and the curved surface of the fluid control member is received in a counter bore in the poppet body. A spring is mounted in the counter bore of the poppet body and biases the curved surface of the fluid control member into a seat at the bottom of the counter bore. A cap is provided that has a hole through which the stem of the fluid control member extends. The cap retains the curved surface of the fluid control member and the spring in the counter bore of the poppet body.

In a different embodiment, the fluid control member includes a hemispherical member mounted to the armature. A magnet can be mounted to the armature to magnetically retain the fluid control member.

In another embodiment of the invention, a valve apparatus is provided to proportionally control fluid flow, wherein the apparatus includes a housing having a valve body with an inlet port having a valve seat and an outlet port; a valve assembly including an armature, a movable fluid control member in the form of a spherical member mounted to the armature, a diaphragm in contact with the valve seat when the valve assembly is in a closed position, and a poppet plate pivoting on the spherical member; and a solenoid assembly including an electromagnetic coil and a pole piece, the solenoid moving the armature when energized to allow fluid to flow through the valve apparatus.

The diaphragm may include an annular channel extending around the valve seat of the inlet port. A retaining ring may be used to mount the diaphragm to the housing, and the diaphragm may extend generally transverse to a longitudinal axis of the valve apparatus. The diaphragm may also extend over both the inlet and the outlet ports. The spherical member can be mounted in a recess of the armature.

In another embodiment of the invention, a valve apparatus is provided to proportionally control fluid flow, wherein the apparatus includes a housing having a valve body with an inlet port having a valve seat and an outlet port; a valve assembly including an armature, a movable fluid control member having a stem with one end of the stem connected to the armature, and the opposite end of the stem has a curved surface, a diaphragm in contact with the valve seat when the valve assembly is in the closed position, and a poppet plate backing the diaphragm; and a solenoid assembly including an electromagnetic coil and a pole piece, the solenoid moving the armature when energized to allow fluid to flow through the valve apparatus.

The valve apparatus may include a poppet body extending from the poppet plate, and the curved surface of the fluid control member is received in a counter bore in the poppet body. A spring may be mounted in the counter bore of the poppet body to bias the curved surface into a seat at the bottom of the counter bore. A cap may be provided that has an opening through which the stem extends. The cap retains the curved surface of the fluid control member and the spring in the counter bore of the poppet body. The poppet plate may extend beyond edges of the valve seat. The diaphragm may extend through the housing over both the inlet port and the outlet port. The diaphragm may include an annular channel extending around the valve seat in the inlet port.

A retaining ring can be used to mount the diaphragm to the housing, and the diaphragm may extend generally transverse to a longitudinal axis of the valve apparatus.

In another embodiment of the invention, a valve apparatus is provided to proportionally control fluid flow, wherein the apparatus includes a housing having a valve body with an inlet port having a valve seat and an outlet port; a valve assembly including an armature, a movable fluid control member including a hemispherical member connected to the armature, a diaphragm in contact with the valve seat when the valve assembly is in a closed position, and a poppet plate; and a solenoid assembly including an electromagnetic coil and a pole piece, the solenoid moving the armature when energized to allow fluid to flow through the valve apparatus.

The valve apparatus may include a magnet mounted to the armature to magnetically retain the hemispherical member thereto. The poppet plate may extend beyond edges of the valve seat. The diaphragm may extend through the housing over both the inlet port and the outlet port, and the diaphragm may include an annular channel extending around the valve seat in the inlet port. The valve apparatus may further include a retaining ring mounting the diaphragm to the housing, and the diaphragm may extend generally transverse to a longitudinal axis of the valve apparatus.

In still another embodiment, a valve apparatus is provided to control a fluid flow, including a housing having a valve body with an inlet port and an outlet port, and a valve seat associated with one of the ports; a valve assembly including an armature, a movable fluid control member, at least one spring biasing the valve assembly into a closed position, and a sealing member in contact with the valve seat when the valve assembly is in a closed position. Two adjustment mechanisms are provided for controlling fluid flow through the ports; and the apparatus also has a solenoid assembly including an electromagnetic coil and a pole piece, the solenoid moving the armature when energized to allow fluid to flow through the valve apparatus.

One of the adjustments can adjust the sealing force on the sealing member against the valve seat, and another varies a gap between the armature and the pole piece. The housing may also include a central casing connected to the valve body, and the sealing force is adjusted by tightening or loosening the connection between the central casing and valve body. The connection between the central casing and the valve body can be through a threaded engagement. The valve apparatus may further include at least one set screw to set the adjustment between the central casing and valve body at the desired place.

The armature may include a fluid control portion having a rounded configuration and the valve assembly may include a poppet, wherein the fluid control portion bears against the poppet. The valve apparatus may further include a closure member located between the poppet and sealing member, and a diaphragm in addition to the sealing member, wherein a portion of the diaphragm is located between the poppet and closure member.

BRIEF DESCRIPTION OF THE DRAWINGS

The above-mentioned and other features of this invention and the manner of obtaining them will become more apparent and the invention itself will be better understood by reference to the following description of embodiments of the present invention taken in conjunction with the accompanying drawings, wherein.

Figure 1:
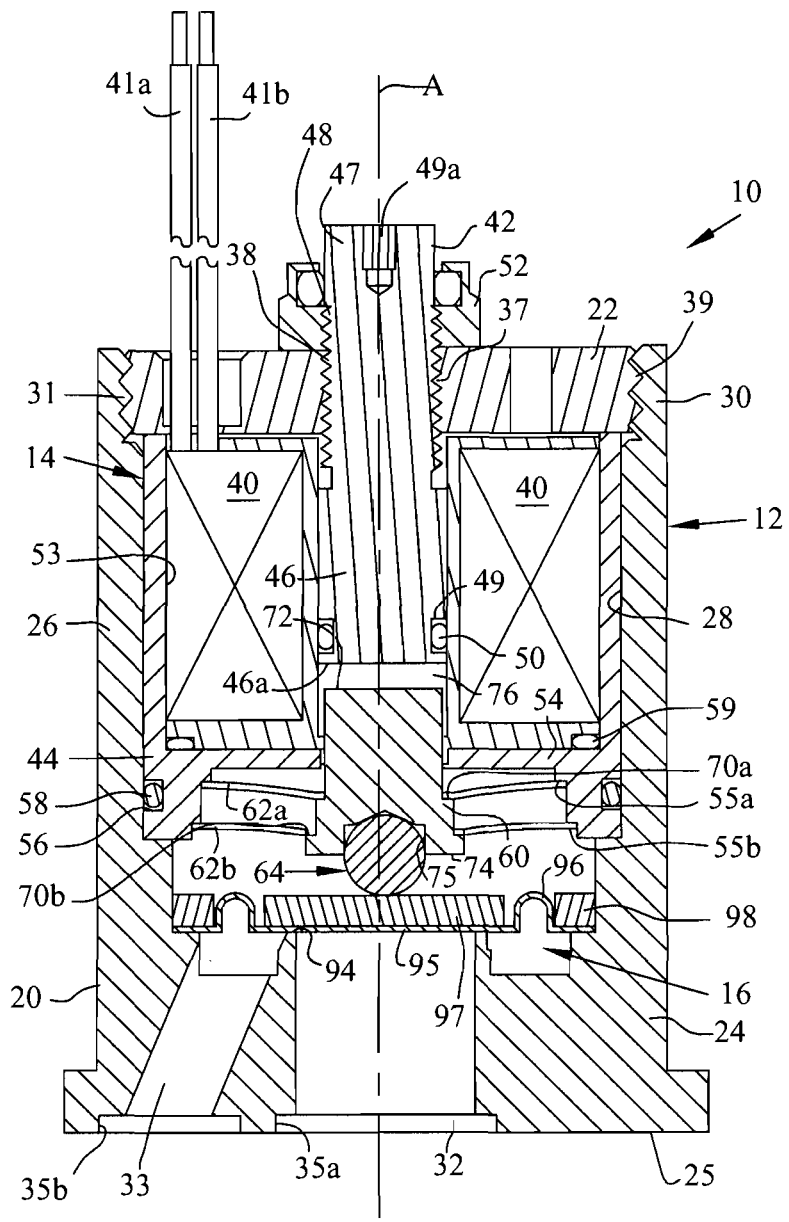
FIG. 1 is a cross-sectional view of one embodiment of a proportional valve apparatus taken through a longitudinal axis of the apparatus and showing the valve in the closed position that prohibits fluid from flowing from an inlet port into an outlet port.

Corresponding reference characters indicate corresponding parts throughout the several views. Although the drawings represent embodiments of the present invention, the drawings are not necessarily to scale and certain features may be exaggerated in order to better illustrate and explain the present invention. The discussion that follows illustrates certain embodiments of the invention and is not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Figure 2:
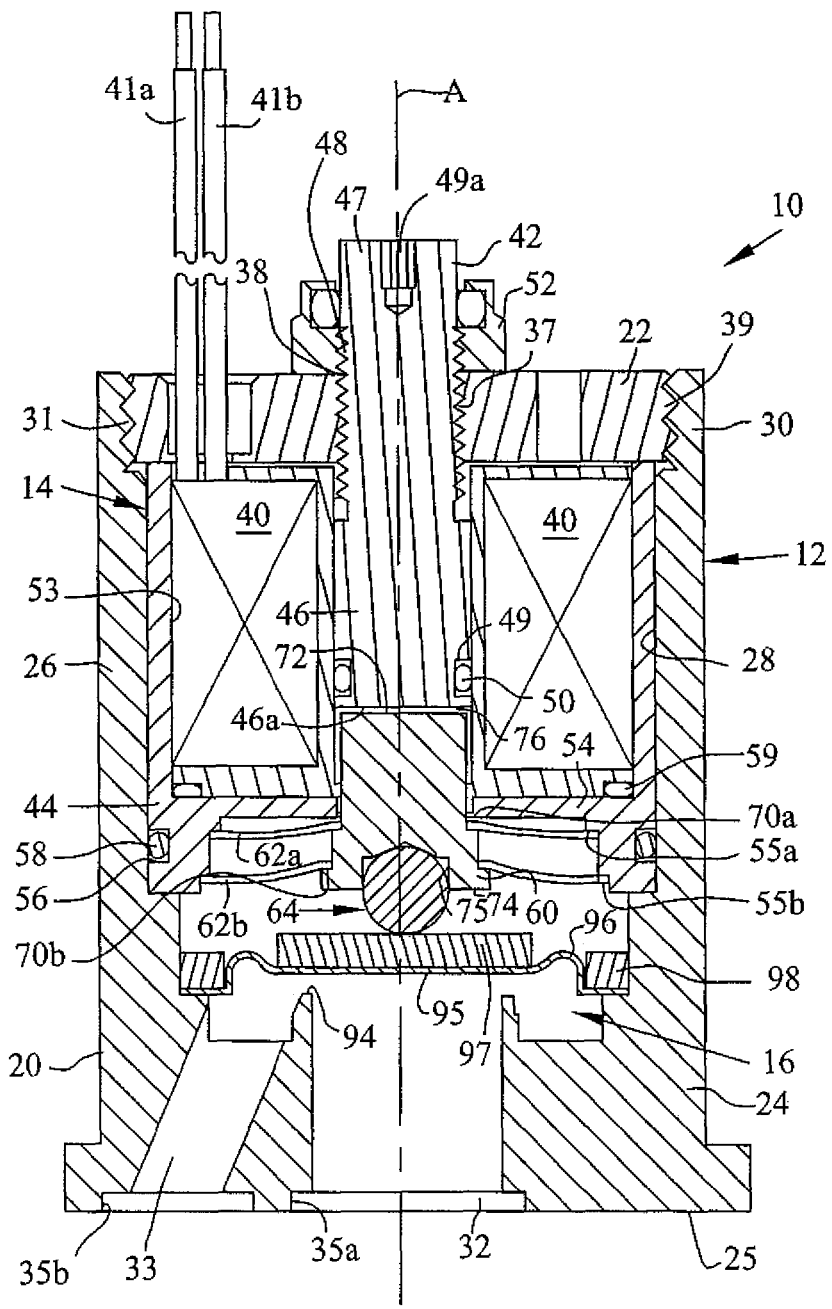
FIG. 2 is a cross-sectional view of the valve apparatus taken in the same plane as FIG. 1 showing the valve in an open position allowing fluid to flow from the inlet port to the outlet port when an electromagnetic coil is energized.

Now referring to FIGS. 1-2, an embodiment of a valve apparatus is designated generally as 10. The valve apparatus includes a housing, generally indicated as 12, a solenoid assembly, generally indicated as 14, and a valve assembly, generally indicated as 16.

Housing 12 includes a valve body 20 and an end piece 22. The valve body 20 includes a lower portion 24 having a bottom surface 25 and an upper portion 26. A bore 28 extends into the valve body. Upper portion 26 also includes an upper end 30, wherein bore 28 is slightly enlarged and has internal threads 31 for receiving the end piece 22.

Valve body 20 also includes an inlet passage or port 32 and an outlet passage or port 33. It should, however, be appreciated that with any of the embodiments disclosed herein, the inlet and outlet passages may be reversed, so that fluid can flow in and out the passages as desired and as mounted in a system. Both inlet passage 32 and outlet passage 33 extend from bottom surface 25 of lower portion 24 of valve body 20 into bore 28. Inlet passage 32 and outlet passage 33 may also each contain a counter bore 35a, 35b, respectively, for receipt of fittings or O-rings to connect fluid conduits (not shown) to carry a fluid (not shown) to and from the valve body.

In the embodiment shown, end piece 22 has a generally disc-like shape with a centrally located bore 37 having internal threads 38. End piece 22 also has external threads 39 extending about the outer circumference thereof. External threads 39 are threadably engaged with internal threads 31 of the upper end 30 of the valve body.

Solenoid assembly 14 includes an electromagnetic coil 40, electrical leads 41a, 41b, a pole piece 42, and a core member 44. Electrical leads 41a, 41b provide electrical current to the electromagnetic coil and extend through an opening in end piece 22. Electromagnetic coil 40 is of a standard design known in the art. Pole piece 42 is manufactured from a ferromagnetic material and includes a lower portion 46 having a bottom surface 46a positioned within electromagnetic coil 40, and an upper portion 47 extending through bore 37 of end piece 22. Upper portion 47 includes external threads 48 that are engageable with threads 38 of end piece 22 and an adjustment recess 49a for receiving a screwdriver, hex wrench, or other adjustment mechanism (not shown). The lower portion 46 of the pole piece includes a groove 49.

The solenoid assembly 14 also includes an O-ring or other sealing member 50 located in groove 49 of the pole piece to preclude fluid from escaping between the pole piece and the electromagnetic coil. Also, a lock nut 52 is located on external threads 48 on the upper portion 47 of the pole piece and is tightened against end piece 22.

Core member 44 of the solenoid assembly has a generally cylindrical configuration and is located in bore 28 of the valve body. Core member 44 also has a central bore 53 in which the electromagnetic coil is contained. Core member 44 further includes an internal flange 54 and a pair of annular shoulders 55a, 55b extending circumferentially about the core member below flange 54. Shoulder 55b is spaced further from a central axis A than shoulder 55a such that the diameter of central bore 53 is greater adjacent shoulder 55b than shoulder 55a. Core member 44 also includes an outer circumferential groove 56 for receipt of an O-ring or other sealing member 58 to preclude fluid from escaping between the core member 44 and upper portion 26 of the valve body 20. Another O-ring 59 is located between the bottom end of coil 40 and internal flange 54 to preclude fluid from escaping between the coil and the core member.

Valve assembly 16 of valve actuating apparatus 10 includes an armature 60, a pair of springs 62a, 62b, and a fluid control member, generally indicated as 64. Armature 60 is comprised of a ferromagnetic material and has a generally cylindrical configuration in the embodiment shown. The armature includes a pair of shoulders 70a, 70b that extend about the outer circumference of the armature. It should be noted that the diameter of the armature is wider at shoulder 70b than at shoulder 70a. Armature 60 also includes an upper surface 72 and a lower surface 74. A recess 75 is located in the lower surface 74 for receiving the movable fluid control member 64, which in this embodiment, is a ball. The upper surface 72 of the armature and the bottom surface 46a of pole piece 42 define a gap 76, as will be described more fully below.

Figure 3:
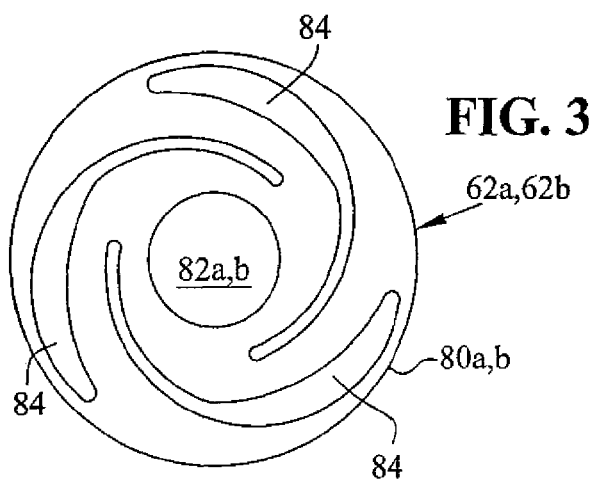
FIG. 3 is a top plan view of one embodiment of springs used in the valve apparatus.

Spring 62a of valve assembly 16 has a generally flat, disc-like configuration (FIG. 3) and is preferably made from a non-magnetic corrosion-resistant material. Spring 62a has an outer circumference 80a, a centrally located hole 82a and arcuate slots 84 radiating outward in a spiral-like configuration around the central hole to provide the desired mechanical stress to deflection relationship of the springs. Spring 62b is similar in configuration to spring 62a except that spring 62b has a larger circumference 80b, as well as a larger centrally located hole 82b than spring 62a. The springs may be manufactured using known chemical etching techniques. In one embodiment, the springs are relatively high rate springs with a rating of 150 to 500 psi.

The inlet passage 32 includes a valve seat 94, which is configured to contact a diaphragm or sealing member 95 of valve assembly 16. Diaphragm 95 includes an annular channel 96 extending around valve seat 94 to increase the flexibility of the diaphragm. Backing diaphragm 95 is a poppet plate 97. Diaphragm 95 is mounted to housing 20 with a retaining ring 98, which may be attached to the bottom of bore 28 with a threaded connection, adhesives or other known attachment mechanism.

When assembled as shown in the figures, the solenoid assembly 14 is mounted within bore 28 of valve body 20. Prior to the insertion of the solenoid assembly in the valve body, diaphragm 95 is placed in valve body 20, as shown in FIG. 1, and retained in that position with retainer ring 98. Poppet plate 97 can then be placed on the diaphragm or alternately pre-attached to the diaphragm as shown in FIG. 1. Ball/fluid control member 64 is mounted in recess 75 of armature 60, and springs 62a, 62b are placed within core member 44, with a portion of the armature inserted through holes 82a and 82b. Armature 60 is inserted through the central holes 82a, 82b of springs 62a, 62b, respectively, such that spring 62a bears against shoulder 70a of the armature, and spring 62b bears against shoulder 70b of the armature. As such, shoulder 70a of the armature has an outer diameter that is smaller than and will pass through central hole 82b of spring 62b, but is greater than and will not pass through central hole 82a in spring 62a. Additionally, the outer portion of spring 62a bears against shoulder 55a of core member 44, and the outer portion of spring 62b bears against shoulder 55b of the core member. Also, as can be seen in the figures, the diameter of spring 62a is smaller than that of shoulder 55b so that spring 62a fits past shoulder 55b. When assembled thusly, springs 62a and 62b will bias fluid control member 64 into poppet plate 97, thereby forcing diaphragm 95 against valve seat 94.

To retain the solenoid assembly within housing 12, end piece 22 is screwed into the valve body such that external threads 39 on the end piece engage internal threads 31 of the upper end 30 of the valve body. External threads 48 on the upper portion 47 of pole piece 42 are threaded with internal threads 38 in the central bore 37 in the end piece to a desired depth to locate the pole piece at the desired position. It should be appreciated that rotation of pole piece 42, as discussed below, will vary its vertical position, which, in turn will vary gap 76. Lock nut 52 serves to lock the pole piece in place when the desired position is attained. Also, when the apparatus is assembled as shown in the figures, O-rings 50, 58 and 59 will inhibit fluid from escaping through bore 28 out the upper end 30 of the housing.

In operation, the armature will assume a first or closed position, as shown in FIG. 1 when the electromagnetic coil 40 is not energized. As current is provided through electrical leads 41a, 41b to electromagnetic coil 40, a magnetic field will be established in pole piece 42, which will attract armature 60 towards it. Of course, springs 62a, 62b, which bear against shoulders 70a, 70b, respectively, of the armature, will provide resistance against the armature moving toward the pole piece. The resistance/tension and resulting flexure in the springs depend upon the thickness and material used. The tension and flexure in the springs will increase as the current supplied by electrical leads 41a, 41b is increased. The increased current results in more magnetic attraction between the pole piece and the armature so that gap 76 is proportionally reduced as the current increases. It should also be noted that in order to maintain proportionality of the valve, the springs should be stiff enough such that under the maximum current, spring 62a does not come into contact with internal flange 54 of core member 44 and so that upper surface 72 of the armature 60 does not contact the bottom surface 46a of pole piece 42. Also, in the embodiment shown, the armature is fully supported by the springs and does not experience friction from contact with other parts that occur in many other valves.

It should also be noted that the inlet fluid should be kept under pressure during operation. This will tend to force diaphragm 95 upward. Accordingly, when the solenoid is energized and the armature is attracted towards the pole piece, the diaphragm pushes the poppet plate upward to pivot on the curved surface of ball/fluid control member 64. Accordingly, as armature 60 raises and lowers in response to the magnetic field produced by the current supplied to coil, and the diaphragm moves away from or towards valve seat 94, fluid will proportionately flow from inlet passage 32 and out outlet passage 33 based upon the amount of current used to energize the coil. The more current that is provided to the coil, the stronger the magnetic field will be, and the further the armature will move upward to reduce gap 76. Accordingly, the amount of displacement of the fluid control member/poppet plate/diaphragm from valve seat 94 will coincide directly with the movement of the armature providing proportional control of the fluid flow.

If the current is reduced, armature 60 moves downward and proportionately reduces the fluid flow as the control member pushes the poppet plate and diaphragm 95 back towards valve seat 94. When the current flow is stopped and the coil is de-energized, springs 62a, 62b bias the armature so that the fluid control member pushes poppet plate 97 and diaphragm 95 to seat the diaphragm against valve seat 94. This prevents any fluid from flowing through inlet port 32 to outlet port 33.

Furthermore, to ensure that the orientation of the plane of diaphragm 95 and poppet plate 97 is properly aligned to the valve seat 94, the fluid control member/ball 64 is permanently affixed to the armature and is in point contact with the poppet plate 97, allowing the poppet plate to pivot thereon and align diaphragm 95 to valve seat 94. Also, since the pressure area/diameter of diaphragm 95 is larger than the orifice defined by valve seat 94, the inlet pressure causes an upward force resulting in diaphragm 95 and poppet plate 97 following the motion of armature 60.

As the springs used in the invention have a relatively high rate, and the armature has a relatively small mass, the system tends to be very responsive to changes in the current supplied to coil 40. The flat springs are preferably, but not necessarily, designed so that the stress is kept to 20% of the maximum yield strength.

An adjustment to the valve may be made to vary the displacement of the fluid control member versus the electrical signal by loosening lock nut 52 and rotating pole piece 42 using a hex wrench or other tool interlocked in recess 49a. This will vary gap 76 as external threads 48 of the pole piece 42 are rotated relative to internal threads 38 of end piece 22. The smaller the gap is, the stronger the magnetic attraction will be between the armature and the pole piece, once the desired position of the pole piece is attained, the lock nut is retightened against end piece 22.

Figure 4:
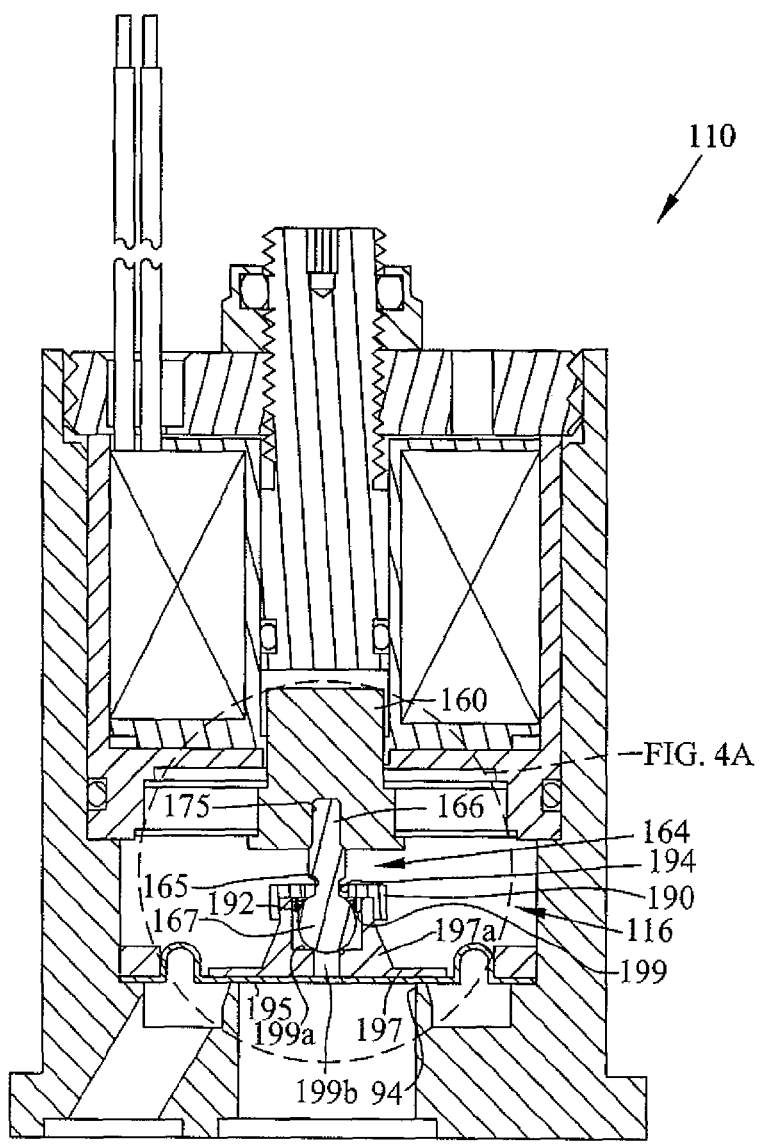
FIG. 4 is a cross-sectional view of an alternate embodiment of a proportional valve apparatus with the valve in the closed position.
Figure 4A:
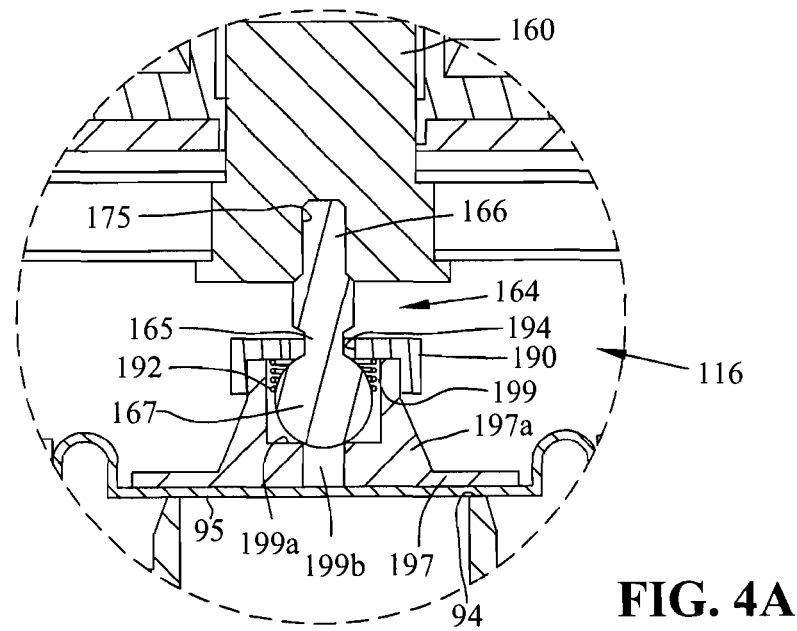
FIG. 4A is an enlarged view of the valve apparatus in the area shown in FIG. 4.

Referring now to FIG. 4, an alternate embodiment of a valve apparatus is designated generally as 110. In the embodiment shown, valve apparatus 110 is similar in all respects to valve actuating apparatus 10 except that it utilizes a modified valve assembly, generally indicated as 116. In lieu of a ball-shaped fluid control member 64, valve assembly 116 utilizes an alternate embodiment armature 160 and fluid control member 164 that includes a stem 165. One end 166 of stem 165 is mounted in a recess 175 of armature 160. The stem may be mounted with a threaded connection, with an adhesive, or other known attachment method. The opposite end 167 of stem 165 includes a curved surface, which in the embodiment shown, has a generally spherical configuration.

Furthermore, valve assembly 116 includes a modified poppet plate 197 having a poppet body 197a extending therefrom. A counter bore 199 is located in the top of poppet body 197 and includes a seat 199a at the bottom thereof. Seat 199a surrounds a through bore 199b.

Valve assembly 116 also includes a retainer or cap 190 configured to fit over the top end of the poppet body where counter bore 199 is located. A spring 192 is located in the counter bore around stem 165. Cap 190 includes an opening 194 through which stem 165 extends.

Valve assembly 116 is assembled with the spherically shaped end 167 contained in the counter bore 199 and spring 192 biasing the spherically shaped end into seat 199a. Cap 190 retains spherically shaped end 167 and spring 192 in counter bore 199 and is mounted to poppet body 197a with a threaded connection, adhesive or other joining method.

Valve apparatus 110 operates in a manner similar to valve apparatus 10, and diaphragm 195, poppet plate 197, and poppet body 197a pivot about spherically shaped end 167 to maintain alignment with valve seat 94.

Figure 5A:
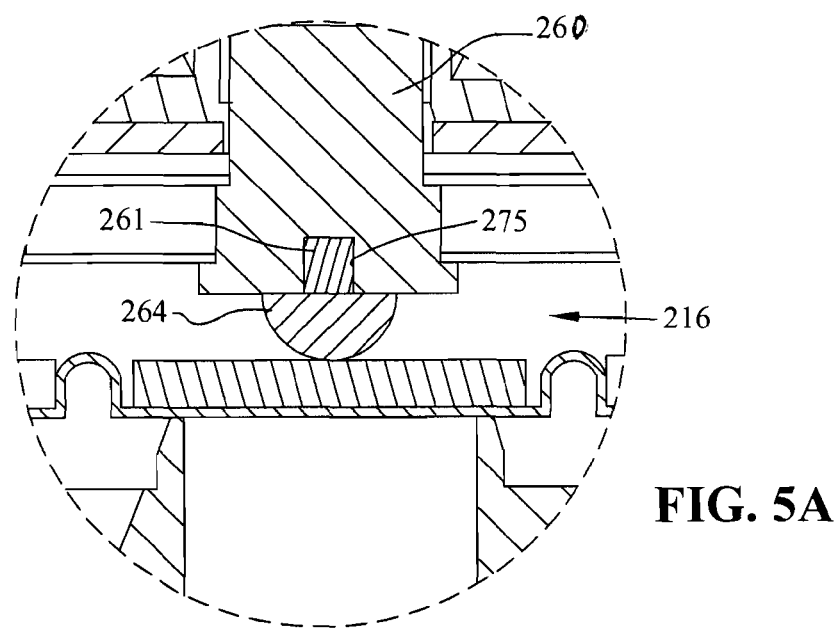
FIG. 5A is an enlarged view of the valve apparatus of the area shown in FIG. 5.
Figure 5:
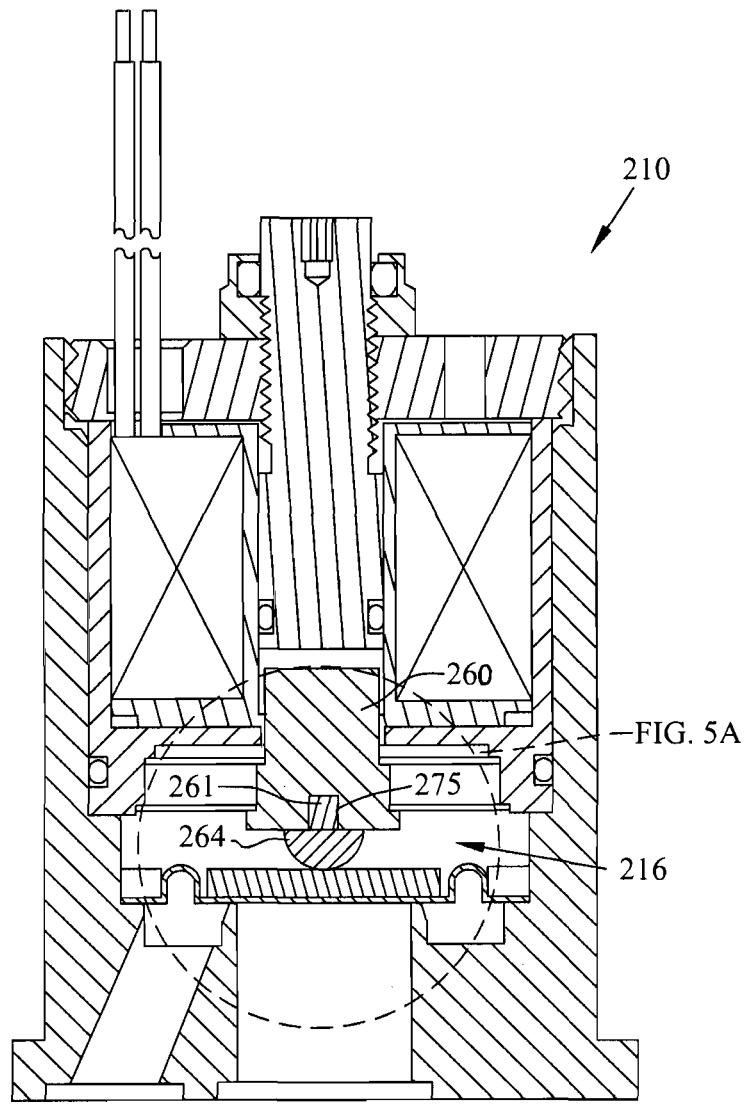
FIG. 5 is a cross-sectional view of another alternate embodiment of a proportional valve apparatus with the valve in the closed position.

Referring now to FIG. 5, another alternate embodiment valve apparatus is shown, generally indicated as 210. In the embodiment shown, valve apparatus 210 is similar in all respects to valve apparatus 10 except it contains a modified valve assembly, generally indicated as 216. Valve assembly 216 includes a modified armature 260 having a magnet 261 mounted in a recess 275. A fluid control member 264 is held by the magnet, and in the embodiment shown, is configured as a half-ball or half-sphere. To be held by magnet 261, fluid control member 264 is manufactured from a ferromagnetic material. Alternately, fluid control member 264 may be attached with an adhesive or include a threaded stem, which may be threaded into recess 275.

Valve assembly 210 is assembled and operated in a manner similar as valve assembly 10.

Referring now to FIGS. 6-9, another alternate embodiment of a valve apparatus is shown, generally indicated as 310. Valve apparatus 310 includes a housing, generally indicated as 312, a solenoid assembly, generally indicated as 314, and a valve assembly, generally indicated as 316.

Housing 312 includes a valve body 20, a central casing 321, and an end piece 322. Valve body 320 includes a bottom surface 325, and central casing 321 includes a lower end 327 and a central bore 328. Bore 328 is slightly enlarged at end 327 and has internal threads for mounting central casing 321 to valve body 320. Central casing 321 also includes an upper end 330, wherein bore 328 is also slightly enlarged and has internal threads 331 for receiving end piece 322.

Valve body 320 also includes a plurality of inlet passages or ports 332 and an outlet passage or port 333. Both inlet passages 332 and outlet passage 333 extend from bottom surface 25 of valve body 320 into the internal portion of the housing. Valve 320 also includes an annular flange 334 having external threads to provide an adjustable attachment to threaded portion 329 in central casing 321 as described in greater detail below. Valve body 320 also has a plurality of threaded apertures 336 for receipt of set screws to fix the adjustment of the attachment of central casing 321 to flange 334, as also discussed below in greater detail.

In the embodiment shown, end piece 322 has a generally disk-like shape with a centrally located bore 337 having internal threads therein. End piece 322 has external threads extending about the outer circumference thereof, which are threadably engageable with internal threads 331 of upper end 30 of central casing 321.

Solenoid assembly 314 is similar to solenoid assembly 14 and includes an electromagnetic coil 340, electrical leads 341a, 341b, a pole piece 342, core member 344. Electrical leads 341a, 341b provide electrical current to the electromagnetic coil and extend through an opening in end piece 322. Electromagnetic coil 340 is of a standard design known in the art, and pole piece 342 is manufactured from a ferromagnetic material and includes a lower portion 346 having a bottom surface 346a positioned within the electromagnetic coil 340. Solenoid assembly 312 has a slightly different configuration than solenoid assembly 14; however, it is made from similar materials and functions in a similar manner. Pole piece 342 includes an upper portion 347 extending through bore 337 of end piece 322. Upper portion 347 includes external threads 348 that are engageable at the threads in central bore 337 of end piece 322. An adjustment recess 349 for receiving a screwdriver, hex wrench or other adjustment mechanism (not shown) is located in the end of upper portion 347. Also, a lock nut 352 is located on external threads 348 on the upper portion 347 of the pole piece and is tightened against end piece 322 to set the gaps between pole piece 322 and a spring mounted armature, as discussed in greater detail below.

Valve assembly 316 of valve actuating apparatus 310 includes an armature 360 and a pair of springs 362a, 362b. Armature 360 includes a pair of shoulders similar to armature 60, wherein springs 362a and 362b are mounted. Also, armature 360 includes a fluid control portion 364, which, in the embodiment shown, has a rounded end to provide a pivoting point contact. Armature 360 also includes an upper surface 374, which, together with the bottom surface of the pole piece 364, defines a gap G.

Figure 6:
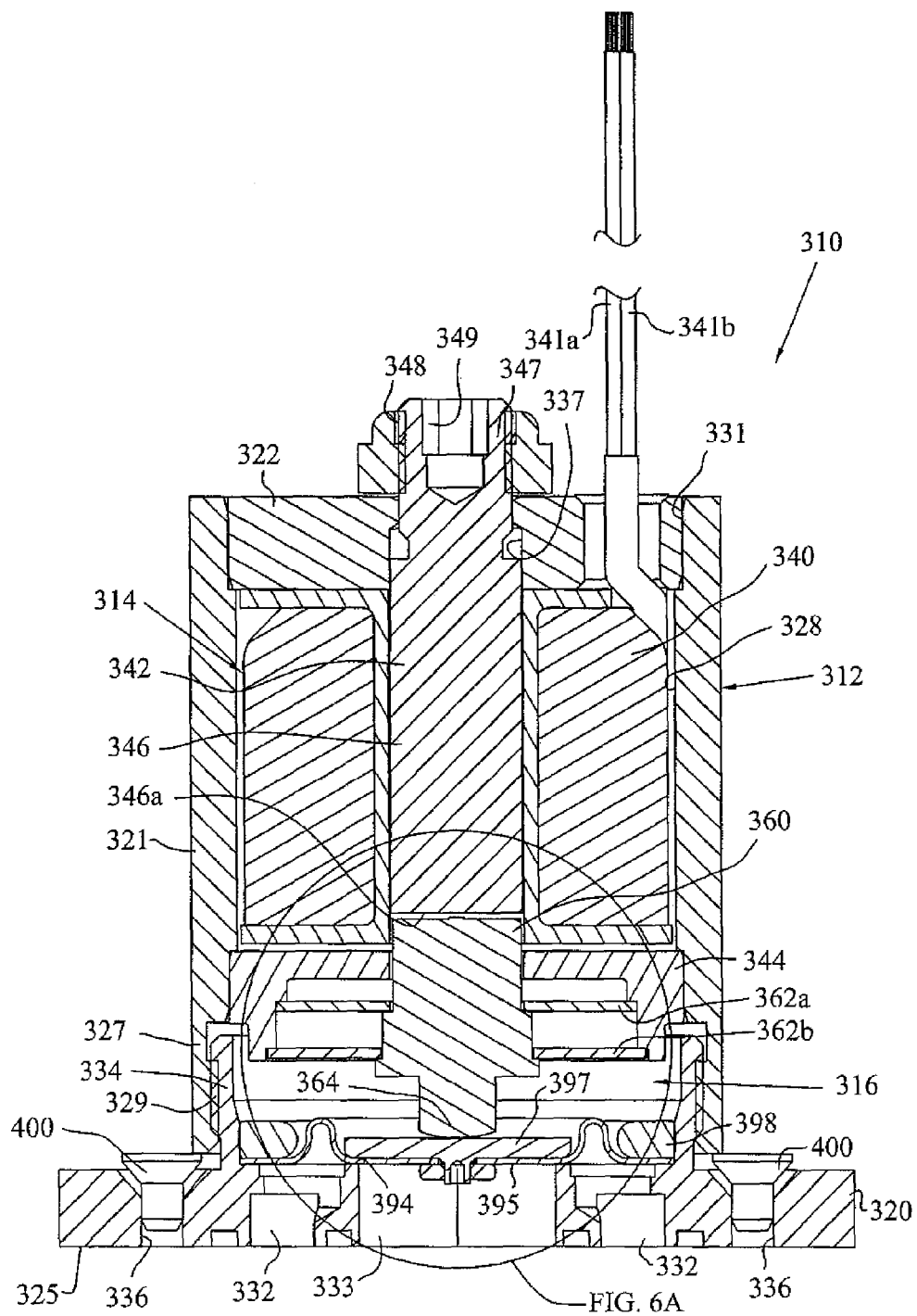
FIG. 6 is a cross-sectional view of yet another alternate embodiment of a proportional valve apparatus with the valve in the closed position.
Figure 6A:
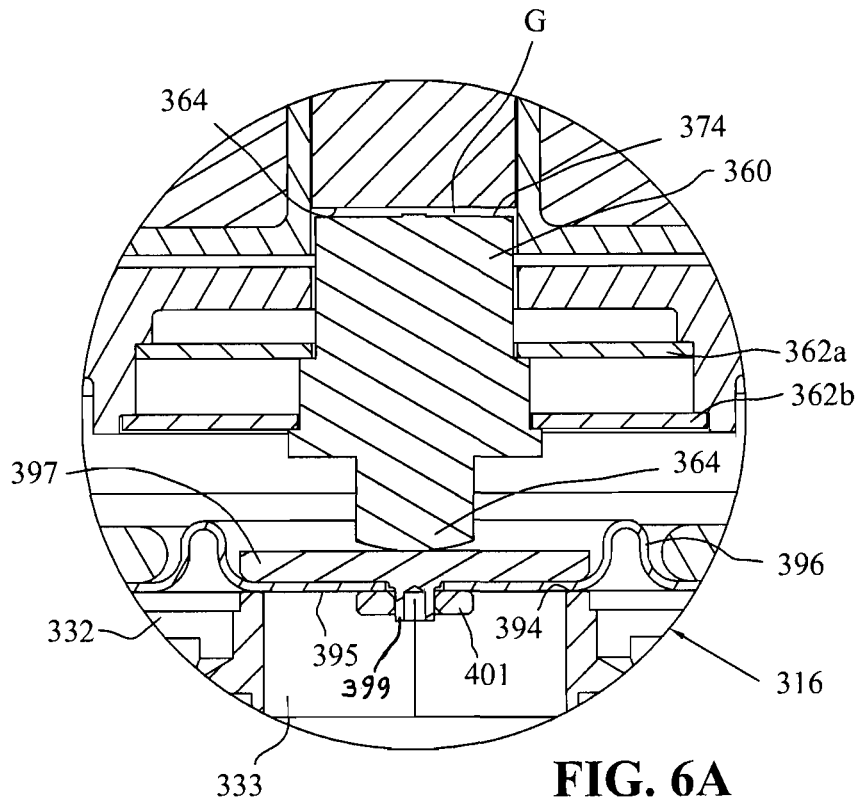
FIG. 6A is an enlarged view of the valve apparatus of the area shown in FIG. 6.
Figure 7:
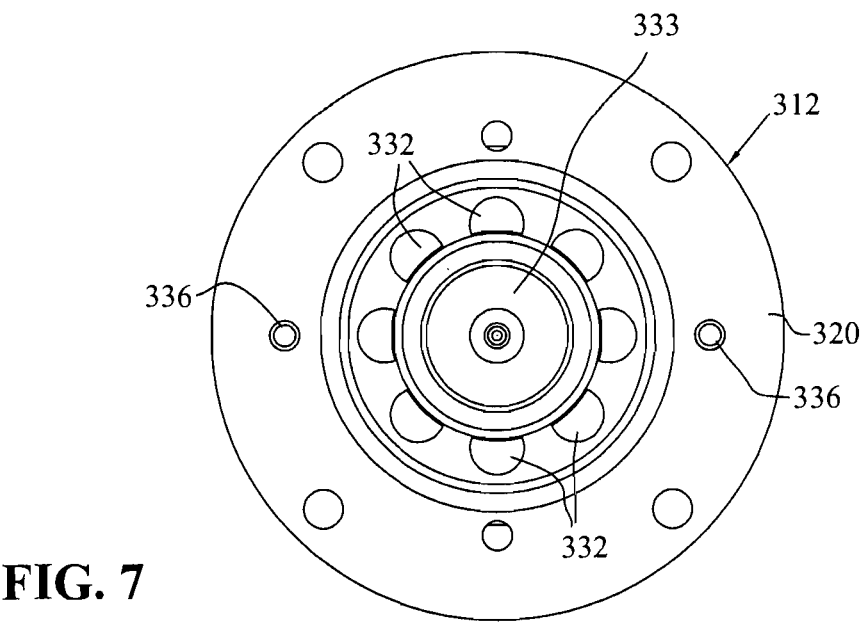
FIG. 7 is a bottom view of the valve apparatus of FIG. 6.
Figure 9:
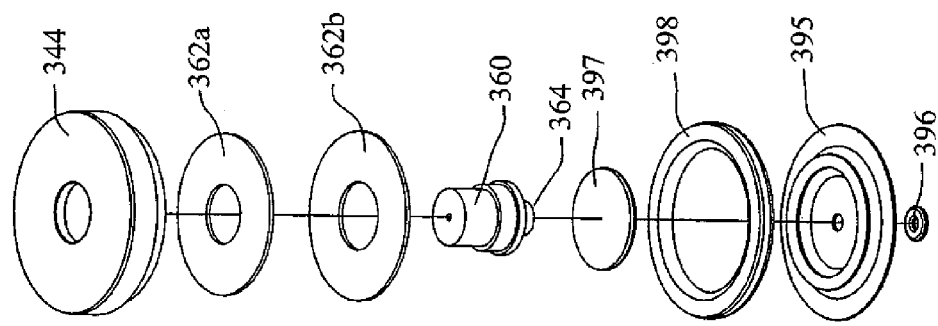
FIG. 9 is another exploded perspective view of the diaphragm assembly of the proportional valve apparatus of FIG. 6.
Figure 8:
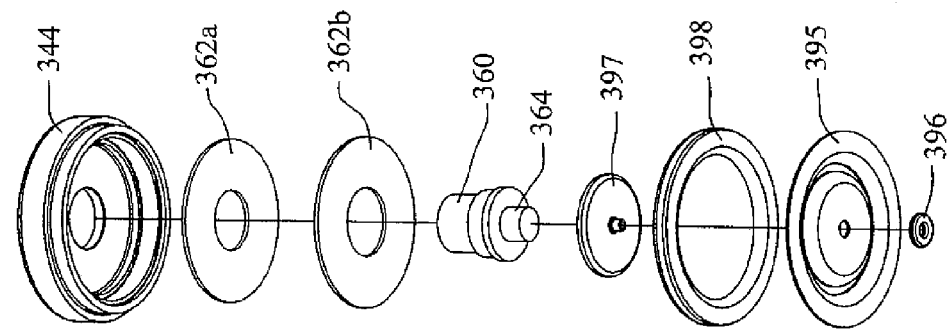
FIG. 8 is an exploded perspective view of a diaphragm assembly of the proportional valve apparatus of FIG. 6.

As best shown in FIGS. 6 and 6A, the inlet passage 332 includes a valve seat 394, which is configured to contact a diaphragm 395 of valve assembly 316. Diaphragm 395 includes an annular channel 396 extending around valve seat 394 to increase the flexibility of the diaphragm. The valve assembly also includes a poppet 397 to provide a backing for diaphragm 395 and to further provide the contact with fluid control portion 364 of armature 360, as discussed below. Diaphragm 395 is mounted to annular flange 334 of valve body 320 with a retaining ring 398, which may be attached with a threaded connection, adhesives or other known attachment mechanism. Also, as best shown in FIG. 6A, poppet 397 includes a threaded nipple 399 to which a retaining nut 401 is mounted to secure diaphragm 395 to the poppet. Valve assembly 316 also includes set screws 400, which can be used to establish a set point for the adjustable attachment of central casing 321 to annular flange 334, and thusly preset the load between fluid control portion 364 of armature 360 and poppet 397.

In operation, the armature 360 of valve apparatus 310 will assume a first or a closed position, as shown in FIG. 6, when the electromagnetic coil 340 is not energized, similar to valve apparatus 10. Furthermore, valve apparatus 310 operates in a similar manner as valve apparatus 10 with the exception that the threaded connection between central casing 321 and annular flange 334 on valve body 320 provides an additional adjustment mechanism. This additional adjustment allows the appropriate sealing pressure of diaphragm 395 against valve seat 394 to be set when coil 340 is not energized. To establish the appropriate force of the springs 362a and 362b pushing the armature and the diaphragm down to seal against valve seat 334, a known pressure is established through either inlet passage 332 or outlet passage 333. Then the threaded attachment of central casing 321 to flange 334 is adjusted so that diaphragm 395 pushes with enough force to seal against valve seat 394, but without excessive force sealing the diaphragm down, which can cause decreased performance of the valve.

The other adjustment for armature 316 is that gap G can be adjusted by threading upper portion 347 up or down in end piece 322 and then securing pole piece 342 with lock nut 352 similar to the adjustment for valve apparatus 10. Adjustment of the gap provides the desired maximum flow of the valve apparatus when electromagnetic coil 340 is fully energized. Accordingly, adjusting both the sealing force of the diaphragm against the valve seat by adjusting the threaded attachment of the central casing to the flange of the valve body and adjusting the gap between the pole piece in the armature can be used to provide the desired flow curve based upon the energizing current. It should also be appreciated that changing the stiffness of the springs can also change the flow characteristics of the valve apparatus, and use of different springs may require different adjustments for the sealing pressure and gap between the pole piece and armature.

Now referring to FIGS. 10-13, another alternate embodiment valve apparatus is shown, generally as 410. Valve apparatus 410 includes a housing 412, solenoid assembly 414, and valve assembly 416. Solenoid assembly 414 is the same or similar to solenoid assembly 314 of valve apparatus 310.

Housing 412 includes a valve body 420, a central casing 421, and an end piece 422. Central casing 421 and end piece 422 are similar to that described for housing 312 of valve apparatus 310. The valve body 420 and valve assembly 416, however, are different, and valve body 420 includes a valve insert 424 including external threads 425, which are threaded into valve body 420. Valve 410 also includes an inlet passage 432 in valve body 420 (best shown in FIG. 11) and an outlet passage 433 located in valve insert 424. Valve body 420 also includes a raised portion 434, which may have external threads for attachment of central casing 421.

Figure 10:
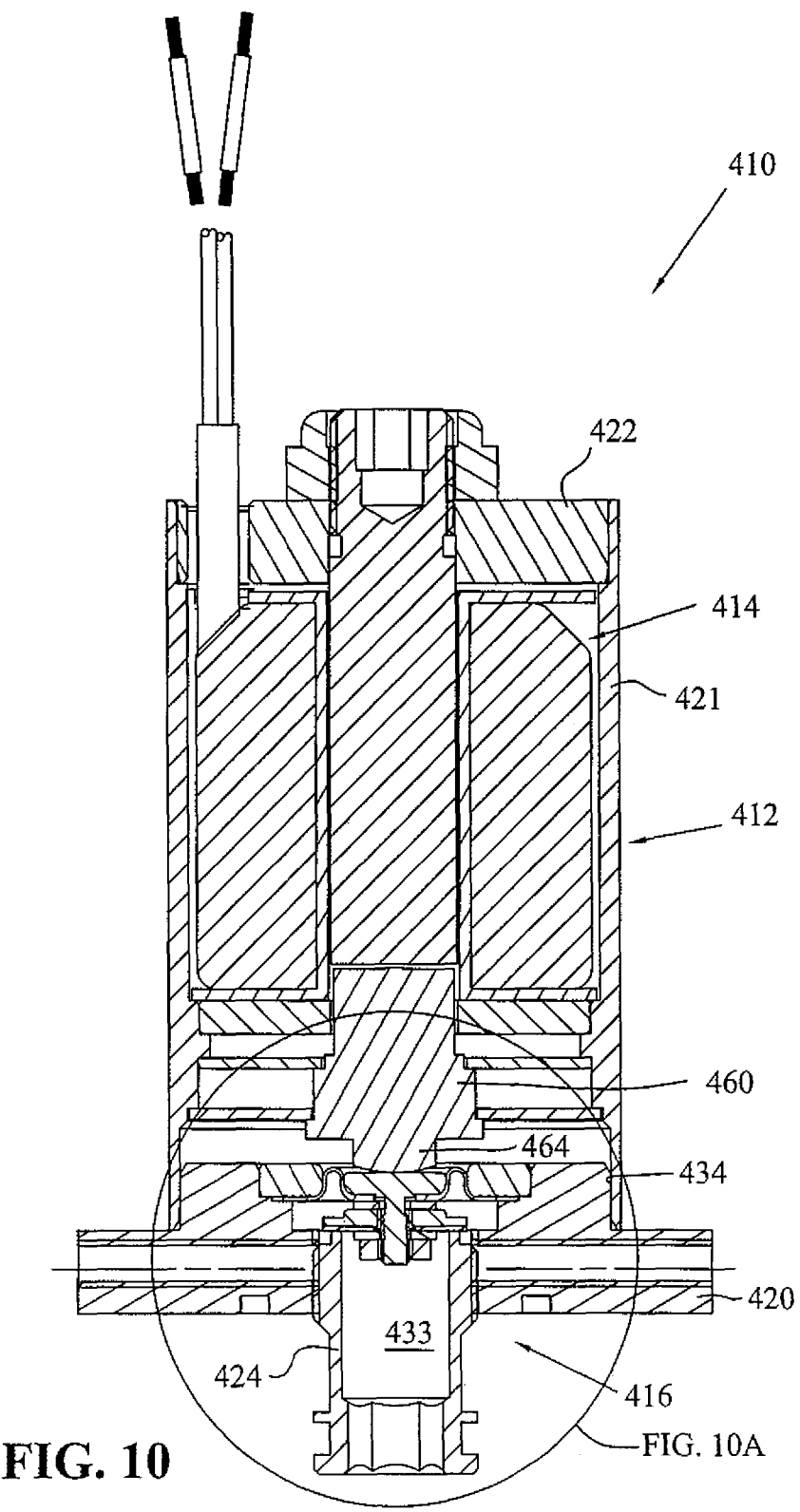
FIG. 10 is a cross-sectional view of yet another alternate embodiment of a proportional valve apparatus with the valve in the closed position.
Figure 10A:
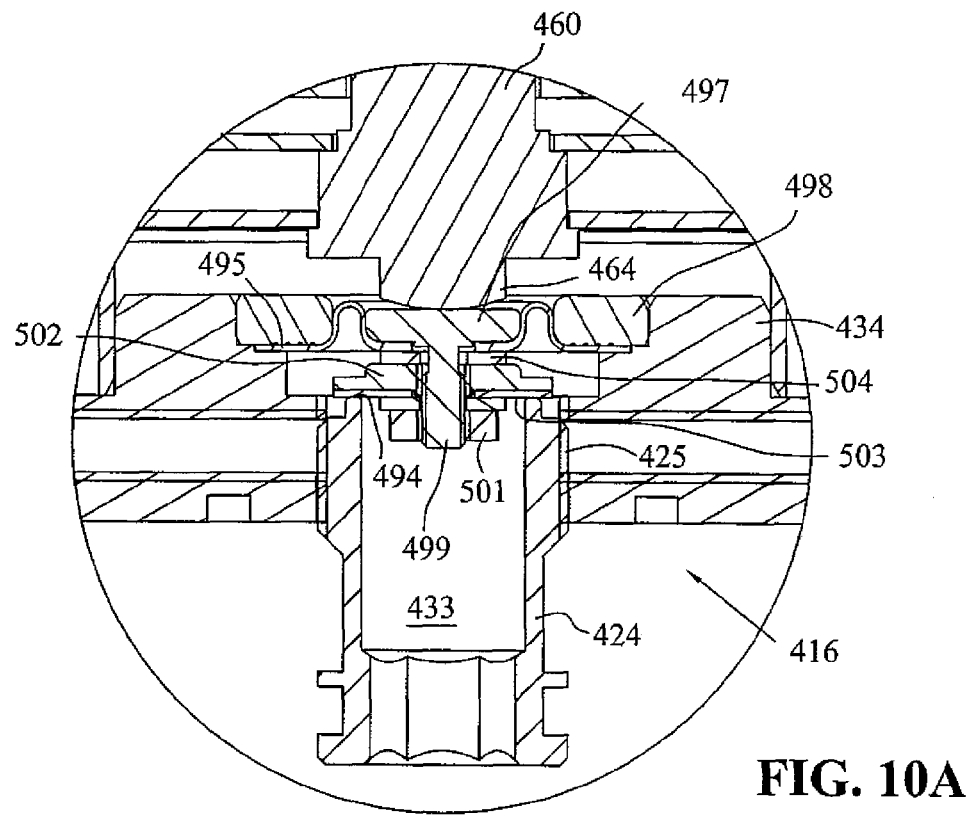
FIG. 10A is an enlarged view of the valve apparatus of the area shown in FIG. 10.
Figure 11:
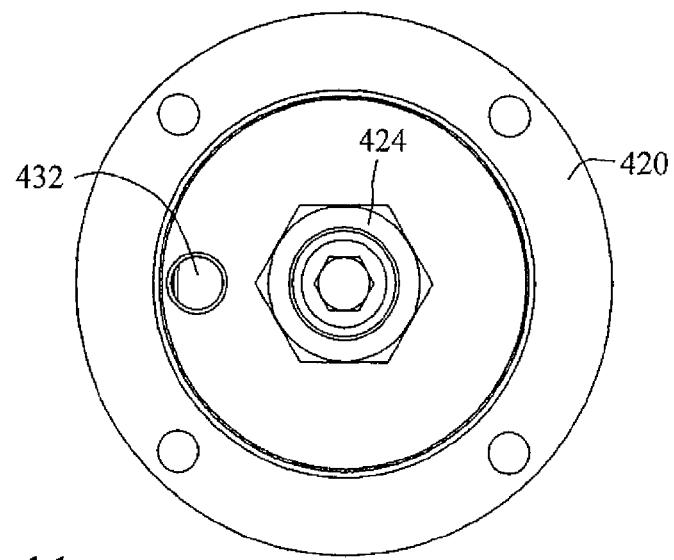
FIG. 11 is an end view of the valve apparatus of FIG. 10.

Valve assembly 416 includes an armature 460 having a rounded fluid control portion 464, a valve seat 494 on valve insert 424, a diaphragm 495, a poppet 497, and a retaining ring 498 for retaining diaphragm 495 in a central bore of raised portion 434 of valve body 420, as best shown in FIG. 10A. Poppet 497 includes a threaded nipple 499 for attachment of a securing nut 501. Valve assembly 410 also includes a closure member 502, a seal 503 mounted between closure member 502 and valve seat 494, as best shown in FIGS. 12 and 13, and a washer 504 between closure member 502 and diaphragm 495.

Figure 13:
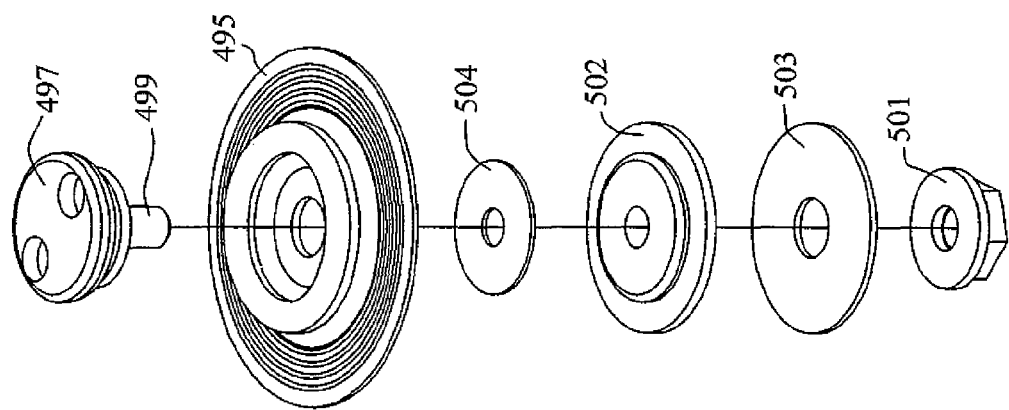
FIG. 13 is another exploded perspective view of the diaphragm assembly of the valve apparatus of FIG. 10.
Figure 12:
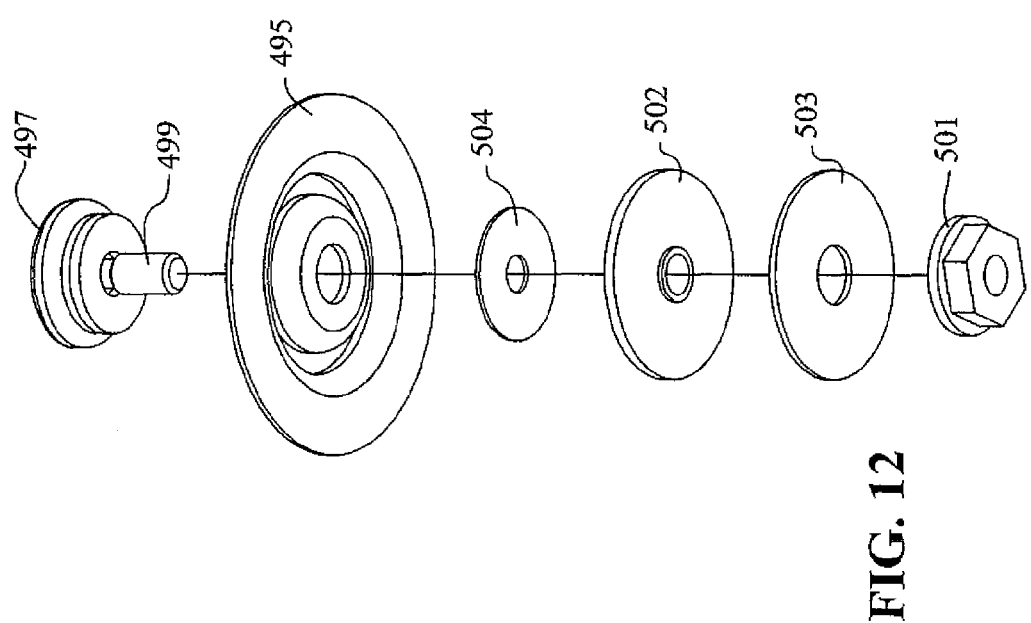
FIG. 12 is an exploded perspective view of the diaphragm assembly of the valve apparatus of FIG. 10.
Figure 14:
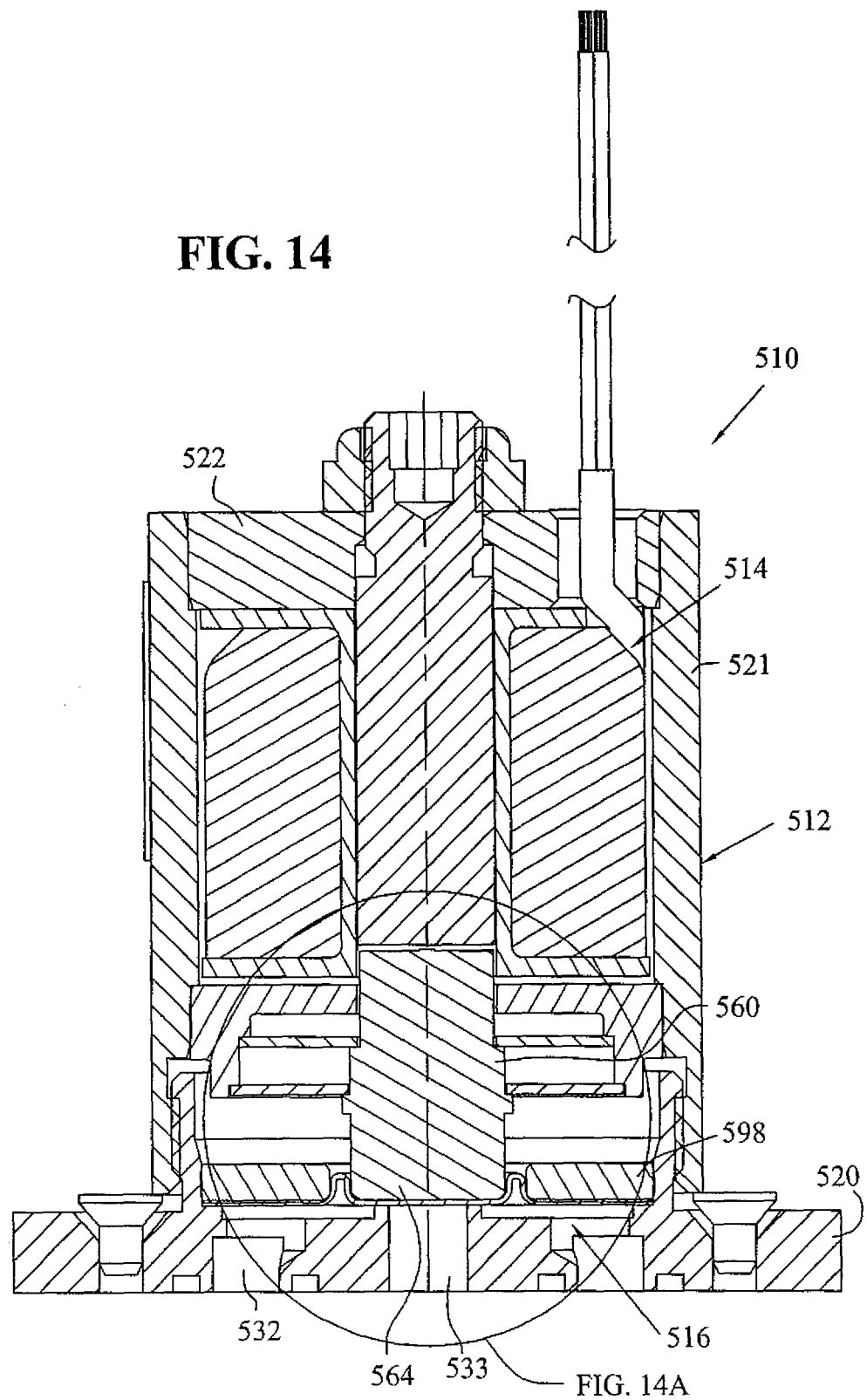
FIG. 14 is a cross-sectional view of yet another alternate embodiment of a proportional valve apparatus with the valve in the closed position.
Figure 14A:
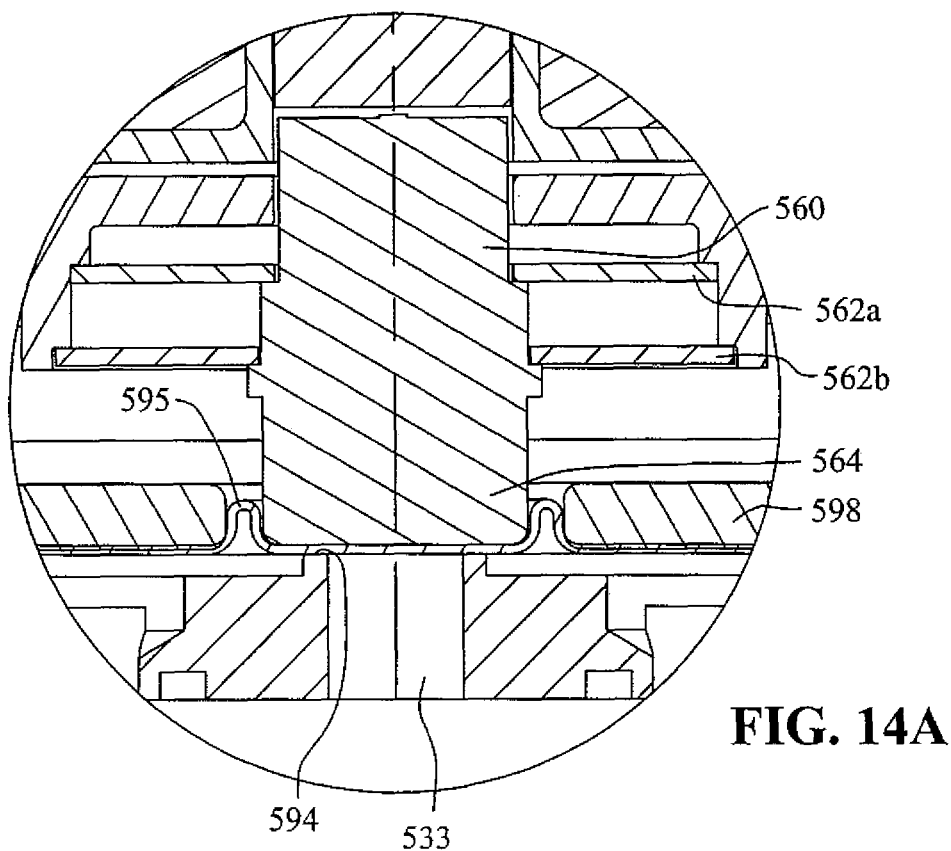
FIG. 14A is an enlarged view of the valve apparatus of the area shown in FIG. 14.
Figure 15:
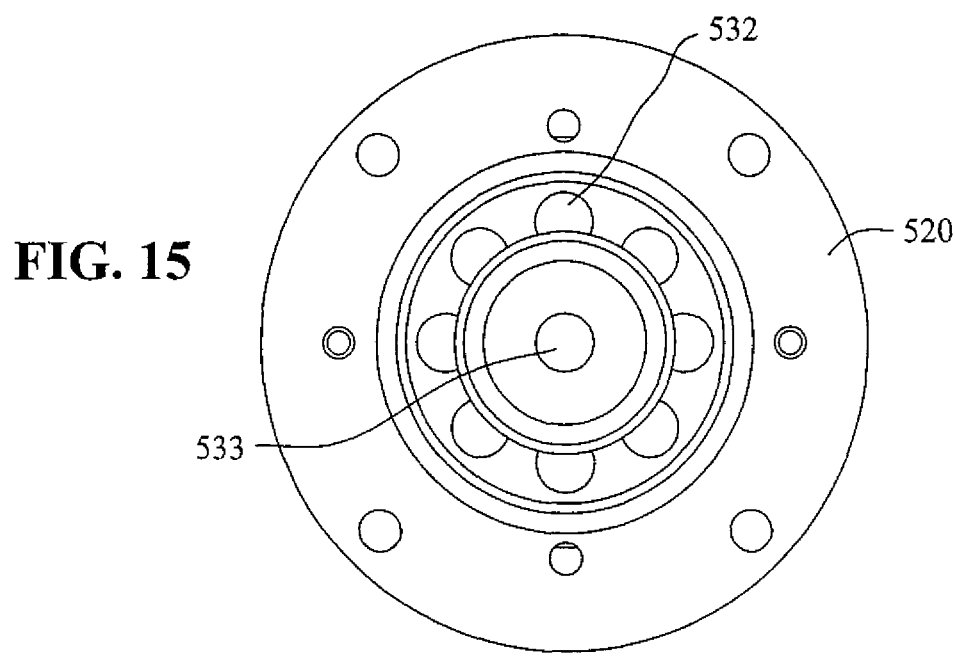
FIG. 15 is a bottom view of the valve apparatus of FIG. 14.
Figure 17:
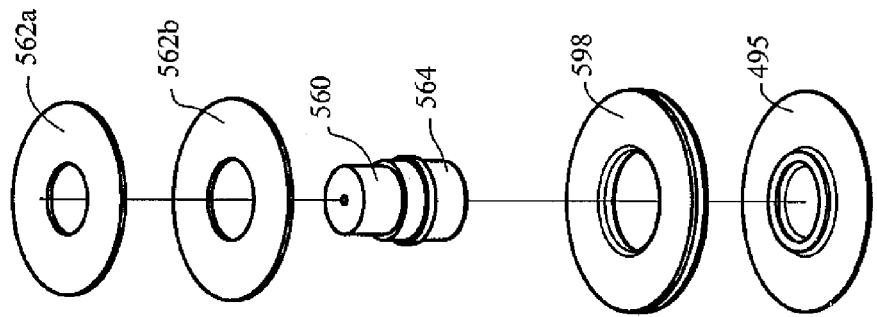
FIG. 17 is another exploded perspective view for the proportional valve apparatus of FIG. 14.
Figure 16:
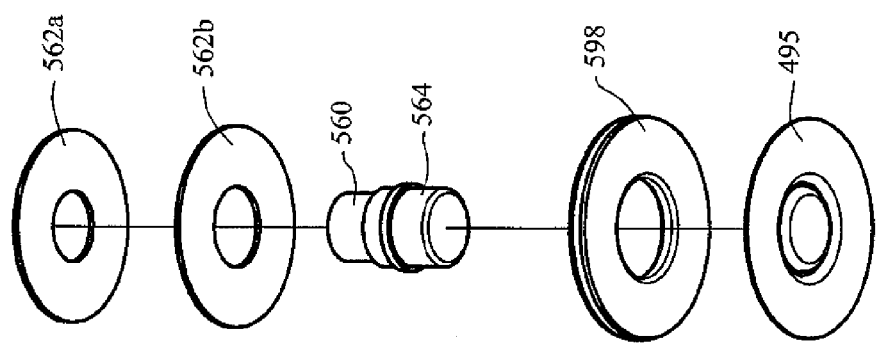
FIG. 16 is an exploded perspective view of the diaphragm assembly of the valve apparatus of FIG. 14.

As best shown in FIGS. 10A and 12-13, valve assembly 416 is assembled with fluid control portion 464 of armature 460 placed against the back of poppet 497. Diaphragm 495 is mounted directly beneath the poppet followed by washer 504, closure member 502 and seal 503, which are all secured to poppet 497 with nut 501.

Valve apparatus 410 has a dual adjustment the same as valve apparatus 310 except that set screws are not provided in the embodiment shown to adjust the connection of central casing 421 to raised portion 434 of the valve body. However, it should be appreciated that set screws or other means may be used to establish and set the adjustment of the central casing to raised portion 434 in the desired position.

Now referring to FIGS. 14-17, another alternate embodiment valve apparatus is shown as 510. Valve apparatus 510 includes a housing 512, a solenoid assembly 514, and a valve assembly 516. Solenoid assembly 514 is similar to solenoid assembly 314 on valve apparatus 310.

Housing 512 includes a valve body 520, a central casing 521, and an end piece 522. Central casing 521 and end piece 522 are the same as central casing 321 and end piece 322 in valve apparatus 310. Valve body 520 includes a plurality of inlet passages 532 and an outlet passage 533. Valve body 520 is similar to valve body 320 of valve apparatus 310 with the exception that outlet passage or port 533 has a smaller diameter. Of course, the number and size of the inlet and outlet passages may be varied within the scope of the claimed invention.

Valve assembly 516 includes armature 560 and springs 562a, 562b. Armature 560 has a fluid control end 564; however, as a poppet plate is not used in this embodiment, the fluid control portion has a generally flat, as opposed to rounded, end. The valve assembly 516 also includes a valve seat 594 on outlet passage 533, a diaphragm 595, and a retaining ring 598 to retain the diaphragm in valve body 520.

Valve apparatus 510 is adjusted and operated in a manner similar to valve apparatus 310.

While the invention has been taught with specific reference to the above embodiments, one skilled in the art will recognize that changes can be made in form and detail without departing from the spirit and scope of the invention. For example, other springs, such as coil springs, may be substituted for the flat springs 62a, 62b. Also, any suitable configuration may be used for the housing, and the springs may be secured in a different manner than between the shoulders on the core member and the armature. The pole piece, the armature, the core member, and the valve insert may also be provided in other suitable configurations besides that shown that will not impair the function. For instance, a square or rectangular configuration could be used.

It should also be appreciated that other configurations may be possible for the passages and ports in the valve body. In addition, the location of the ports and passages is not limited as shown and may be located anywhere in the valve apparatus that will provide the desired fluid flow characteristics.

Additionally, other solenoid configurations may be used and the pole piece configured accordingly. Also, although the above-described embodiment provides proportional fluid control without the need of a permanent magnet in the solenoid assembly, a permanent magnet may be added to provide a constant predetermined magnetic flux density in the pole piece and pre-charge the system to help reduce the traditional non-linear, low power portion of the displacement versus electrical current relationship. This can also help to manipulate the magnetic path to cause magnetic permeance to remain constant as a function of displacement. The described embodiments are, therefore, to be considered in all respects only as illustrative and not restricted. As such, the scope of the invention is indicated and limited only by the claims and equivalents thereof rather than by the description or drawings.

What is claimed is:

1. A valve apparatus for providing control of a fluid flow, including:
 a housing having a central casing and valve body with an inlet port and an outlet port, and a valve seat associated with one of the ports;
 a valve assembly including an armature, a movable fluid control member, and at least one spring biasing the valve assembly into a closed position, a diaphragm in contact with the valve seat when the valve assembly is in the closed position, and a poppet plate attached to the diaphragm, responding to movement of the fluid control member and extending over the valve seat on the inlet or outlet port;
 a solenoid assembly including an electromagnetic coil and a pole piece, the solenoid moving the armature when energized to allow fluid to flow through the valve apparatus, and
 dual adjustments for control of the fluid flow, wherein one of the adjustments adjust a sealing force of the diaphragm and the other adjustment varies a gap between the armature and the pole piece, the adjustment of the sealing force including a connection which varies the distance between a bottom end of the central casing and the valve body and a stop including an adjustable set screw, screwable into the valve body, is provided to set the distance between the bottom of the central casing and the valve body.

2. The valve apparatus as set forth in claim 1, wherein the diaphragm extends over both the inlet port and the outlet port.

3. The valve apparatus as set forth in claim 1, wherein the diaphragm includes an annular channel extending around the valve seat.

4. The valve apparatus as set forth in claim 1, wherein the bottom of the central casing abuts atop the set screw.

5. The valve apparatus as set forth in claim 1, further including a retaining ring mounting the diaphragm to the housing.

6. The valve apparatus as set forth in claim 5, wherein the diaphragm extends generally transverse to a longitudinal axis of the valve apparatus.

7. The valve apparatus as set forth in claim 1, wherein the fluid control member includes a curved surface.

8. The valve apparatus as set forth in claim 7, wherein the fluid control member includes a stem connected to the armature, and the curved surface is on the end of the stem opposite the end connected to the armature.

\* \* \* \* \*